(12) United States Patent
Qiu et al.

(10) Patent No.: US 9,839,816 B2
(45) Date of Patent: Dec. 12, 2017

(54) BALL PICKUP DEVICE

(71) Applicant: Ping Qiu, Guangdong (CN)

(72) Inventors: Ping Qiu, Guangdong (CN); David Yuan, New York, NY (US)

( * ) Notice: Subject to any disclaimer, the term of this patent is extended or adjusted under 35 U.S.C. 154(b) by 0 days.

(21) Appl. No.: 15/329,975

(22) PCT Filed: May 22, 2015

(86) PCT No.: PCT/CN2015/079583
§ 371 (c)(1),
(2) Date: Jan. 27, 2017

(87) PCT Pub. No.: WO2016/026335
PCT Pub. Date: Feb. 25, 2016

(65) Prior Publication Data
US 2017/0266515 A1    Sep. 21, 2017

(30) Foreign Application Priority Data

Aug. 19, 2014 (CN) .......................... 2014 1 0408291

(51) Int. Cl.
*A63B 47/02* (2006.01)
*F16M 11/32* (2006.01)
*F16M 13/06* (2006.01)
*F16M 13/04* (2006.01)

(52) U.S. Cl.
CPC .............. *A63B 47/02* (2013.01); *F16M 11/32* (2013.01); *F16M 13/04* (2013.01); *F16M 13/06* (2013.01); *A63B 2210/58* (2013.01)

(58) Field of Classification Search
CPC .... A63B 47/02; A63B 2210/58; F16M 11/32; F16M 13/04; F16M 13/06
See application file for complete search history.

(56) References Cited

U.S. PATENT DOCUMENTS

| | | | | |
|---|---|---|---|---|
| 3,820,836 A | * | 6/1974 | Seewagen et al. | A63B 47/02 294/19.2 |
| 3,889,996 A | * | 6/1975 | Campbell | A63B 47/02 294/19.2 |
| 4,412,697 A | * | 11/1983 | Verde | A63B 47/02 294/19.2 |
| 4,811,980 A | * | 3/1989 | Ferrari | A63B 47/02 294/19.2 |
| 5,301,991 A | * | 4/1994 | Chen | A63B 47/021 248/132 |

(Continued)

*Primary Examiner* — Raleigh W Chiu
(74) *Attorney, Agent, or Firm* — Li/Cai Intellectual

(57) ABSTRACT

A ball pickup device is provided, comprising a ball collector and a pull rod connected to the ball connector. The ball collector has ball inlets formed at the bottom of the ball collector and formed by transverse rods arranged at the bottom of the ball collector in parallel at intervals, and one ball outlet is formed by the interval between every two adjacent transverse rods. Each interval is smaller than the diameter of a ball. One end of each transverse rod is fixedly connected to the ball collector, and the other end is a movable end and located in the corresponding receding groove. When a ball is pressed, movable ends move along receding grooves to recede under the pressure of the ball, and the ball enters the ball collector. After the ball enters the ball inlet, movable ends move along receding grooves to gradually return.

10 Claims, 7 Drawing Sheets

(56) References Cited

U.S. PATENT DOCUMENTS

| | | | | |
|---|---|---|---|---|
| 5,464,262 | A * | 11/1995 | Madrazo | A63B 47/02 294/19.2 |
| 6,142,544 | A * | 11/2000 | Benzoni | A63B 47/02 280/47.18 |
| 7,377,565 | B1 * | 5/2008 | Beavin | A63B 47/02 294/19.2 |
| 2004/0227365 | A1 * | 11/2004 | Hellerson | A63B 47/02 294/19.2 |
| 2009/0020441 | A1 * | 1/2009 | Beavin | A47C 13/00 206/223 |
| 2010/0193379 | A1 * | 8/2010 | Matthews | A63B 47/002 206/216 |
| 2011/0262259 | A1 * | 10/2011 | Zats | A63B 47/02 414/800 |
| 2017/0266515 | A1 * | 9/2017 | Qiu | A63B 47/02 |

\* cited by examiner

BALL PICKUP DEVICE

BACKGROUND

1. Technical Field

The present disclosure relates to the technical field of a ball collecting gear, in particular, to a ball pickup device.

2. Description of Related Art

In recent years, ball games such as tennis, table tennis, and golf and so on are becoming increasingly popular, and ball games enthusiasts are also gradually increasing. The "multi-ball training" has been widely used in many ball games. Although such a practice has positive impact on ball game players, it cannot avoid balls scattering on the practice ground in the practice process. Further, collecting balls scattering on the practice ground after the practice is a troublesome problem, and it is a difficulty to the practitioner in picking up the scattered balls. For example, balls would disperse on the practice ground, and the practitioner has to pick up those balls one by one. It is time-consuming. The practitioner has to stoop down frequently in the process of picking up balls, which undoubtedly consumes the strength. In addition, one person can normally pick up a maximum of four to six balls by two hands if there are too many balls to be collected. After the collection, the balls need to be gathered. It is a waste of time.

In the light of this, there are various devices for picking up balls developed to overcome the above-mentioned problems, and the following two kinds of devices for picking up balls are most commonly-used.

One is devices for automatically picking up balls. Generally, such a device is disposed with a ball pickup system configured to control the device to automatically execute all the steps, including detecting a position of each ball, moving the device to the position to pick up the ball, driving the device to return to its original location, and releasing the collected balls, and so on. The automatized device is user-friendly, but its structure is complicated and the device is not economically available. Thus such a device can only be applied to high-consumption and high-grade sports venues.

The other is general devices for picking up balls. For example, the patent number: 201120548989.1 disclosed a convenient ball picker which comprises a ball collecting net, a ball inlet port, a ball inlet hole, a ball outlet port and a handheld handle, wherein the ball collecting net is of a conical basket shape; the ball inlet port is arranged on the lower part of the ball collecting net; the ball inlet hole is formed at the ball inlet port; the ball inlet hole is an elastic net opening; the ball outlet port is arranged on the upper part of the ball collecting net; the ball outlet port is of a cover shape; and the handheld handle is arranged at the ball outlet port on the upper part of the ball collecting net. The convenient ball picker is simple in structure and convenient in use; if the ball collecting net is covered on a ping-pong ball, the ping-pong ball enters into the ball collecting net from the ball inlet hole; and if the cover of the ball outlet port is opened, the ping-pong ball can be poured out. Despite the simple structure and convenience in use, the convenient ball picker cannot avoid the wear and tear, break and the deterioration of tightness of the net as its ball inlet port is an elastic net opening, resulting in the balls to drop out of the ball collecting net easily. For the continuous use, the elastic net opening at the bottom of the ball collecting net or the entire ball collecting net has to be replaced frequently, which increases the user's burden and difficulty of use.

When using conventional devices for picking up balls, it cannot prevent balls from being excessively squeezed because of the structure, such that it would cause damage to the surface or the main body of a ball.

In view of the problems mentioned above, there is a need to provide a ball pickup device which is not only of a user-friendly structure capable of preventing each ball from being excessively squeezed to cause damage to its surface or the main body in the picking process, but also advantageous to pick up balls more easily and effortlessly. In addition, the ball pickup device is low cost and has a long service life.

SUMMARY

The primary purpose of the present disclosure is to provide a ball pickup device which is not only of a user-friendly structure capable of preventing each ball from being excessively squeezed to cause damage to its surface or the main body in the picking process, but also advantageous to pick up balls more easily and effortlessly. In addition, the ball pickup device provided in the present disclosure is low cost and has a long service life.

A ball pickup device of the present disclosure can be implemented by the following technical solutions.

A ball pickup device is provided, including a ball collector and a pull rod connected to the ball connector. The ball collector is provided with ball inlets and a ball outlet. The ball inlets are formed in the bottom of the ball collector and are formed by a plurality of transverse rods arranged at the bottom of the ball collector in parallel at intervals. One ball inlet is formed by the interval between every two adjacent transverse rods, and the interval between every two adjacent transverse rods is smaller than the diameter of a ball. One end of each transverse rod is fixedly connected to one side of the frame at the bottom of the ball collector and the other end of each transverse rod is a movable end and located in the corresponding receding groove, each receding groove is disposed at the other side of frame at the bottom of the ball collector, and the largest receding interval of each movable end is larger than the diameter of a ball. When a ball is pressed, the movable ends of the transverse rods move along the receding grooves to recede under the pressure of the ball, and the ball enters the ball collector through one ball inlet; after the portion with the largest cross section diameter, connected to the corresponding transverse rods, of the ball enters the ball inlet, the movable ends of the transverse rods move along the receding grooves to gradually return.

The receding groove includes a positioning groove and given-way grooves communicating with the positioning groove, and the movable end of each transverse rod is in the positioning groove when it is a static condition.

Each given-way groove extends upwards and obliquely from an adjacent end of the positioning groove.

The transverse rod is an elastic transverse rod and can be made of glass fiber.

Sliding grooves are respectively disposed at two opposite top frames of the ball collector, a movable rod is provided at the top of the ball collector, two ends of the movable rod respectively correspond to the sliding grooves, and the ball outlet is opened or closed by moving the movable rod along the sliding grooves.

A top transverse rod parallel to the movable rod is provided at the top of the ball collector, and fastening members are provided to fasten the movable rod, wherein one end of each fastening member is engaged with the top transverse rod and the other end is used to fasten the movable rod.

A position where each of the two top frames of the ball collector corresponding to each end of the top transverse rod is provided with a sliding groove and the top transverse rod is movable along the sliding groove.

The bottom of the ball pickup device is provided with a set of rollers.

The ball collector is provided with a detachable supporting rod, a location where the pull rod connects the ball connector is disposed with a rotating apparatus, the pull rod is rotated underneath the ball collector through the rotating apparatus, and the supporting rod and the pull rod which has been rotated underneath the ball collector together form a supporting frame to support the ball pickup device.

The ball collector is provided with a connecting part, and the supporting rod is detachably connected to a connecting end of the connecting part.

The pull rod is a telescopic rod.

In conclusion, the present disclosure has the following advantages.

A ball pickup device of the present disclosure includes a ball collector and a pull rod connected to the ball connector. The ball collector is provided with ball inlets and a ball outlet. The ball inlets are formed in the bottom of the ball collector and are formed by a plurality of transverse rods arranged at the bottom of the ball collector in parallel at intervals. One ball inlet is formed by the interval between every two adjacent transverse rods, and the interval between every two adjacent transverse rods is smaller than the diameter of a ball. One end of each transverse rod is fixedly connected to one side of the frame at the bottom of the ball collector, the other end of each transverse rod is a movable end and located in the corresponding receding groove, and the largest receding interval of each movable end is larger than the diameter of a ball. When a ball is pressed, the movable ends of the transverse rods move along the receding grooves to recede under the pressure of the ball, and the ball enters the ball collector through one ball inlet; after the portion with the largest cross section diameter, connected to the corresponding transverse rods, of the ball enters the ball inlet, the movable ends of the transverse rods move along the receding grooves to gradually return.

In addition, the disclosed ball pickup device uses the transverse rod of which one end is fixedly disposed to cooperate with the receding groove to pick up ball. When the ball collector presses a ball on the ground, the movable ends of the transverse rods move along the receding grooves to recede under the pressure of the ball, and the interval between two adjacent transverse rods increases due to the pressure of the ball, such that the ball enters the ball collector through the increased ball inlet. After the portion with the largest cross section diameter, connected to the corresponding transverse rods, of the ball enters the ball inlet, the movable ends of the transverse rods move along the receding grooves to gradually return and then the ball is remained in the ball collector. The ball pickup device is advantageous to pick up balls more easily and effortlessly and has a longer service life than its conventional counterparts by using the preceding grooves. In addition, the ball inlets which are formed by a plurality of transverse rods arranged in parallel at intervals can pick up balls scattering on areas where the ball collector covers, thereby collecting balls more effectively. In addition, the present disclosure can prevent each ball from being excessively squeezed or from an external pressure to cause damage to its surface or the main body by using the simple structure in the picking process. In addition, the ball pickup device provided in the present disclosure is low cost and has a long service life.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
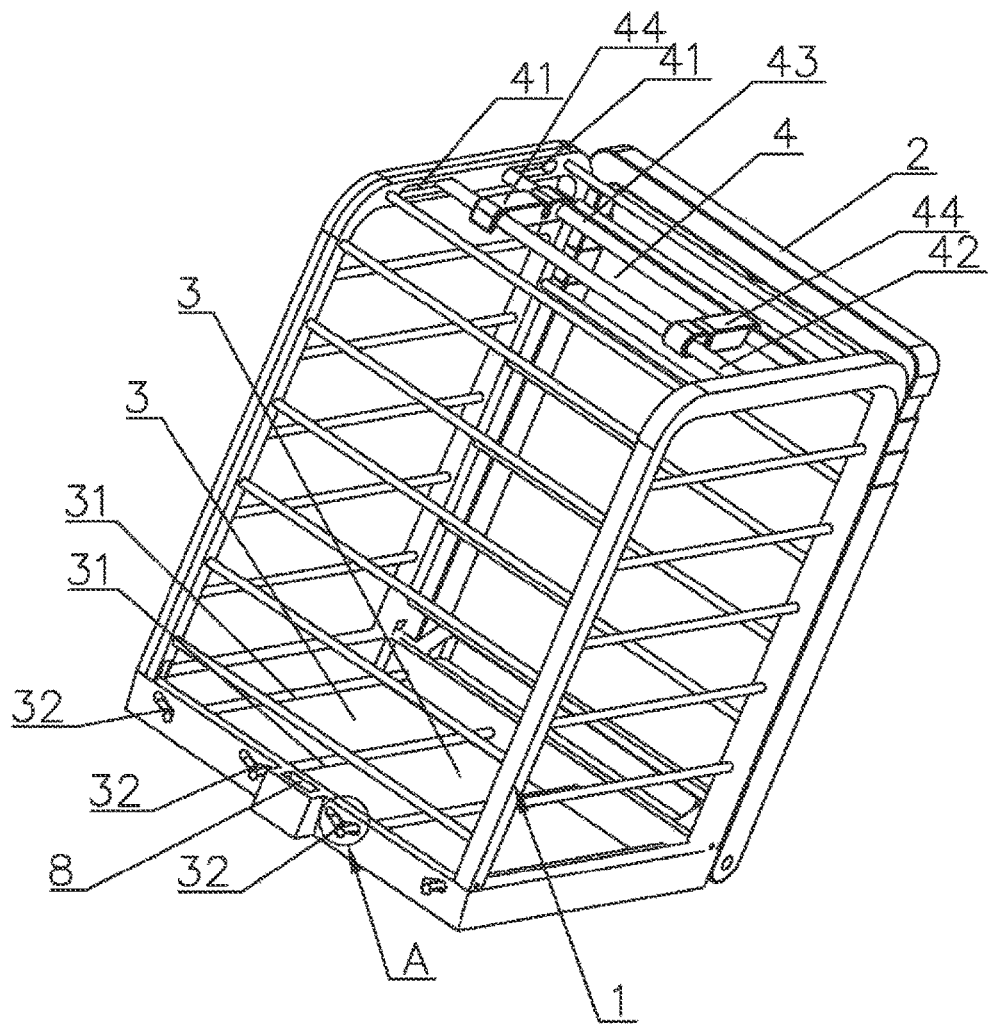
FIG. 1 is a schematic diagram illustrating the structure of a ball pickup device of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

EMBODIMENT 1

Figure 2:
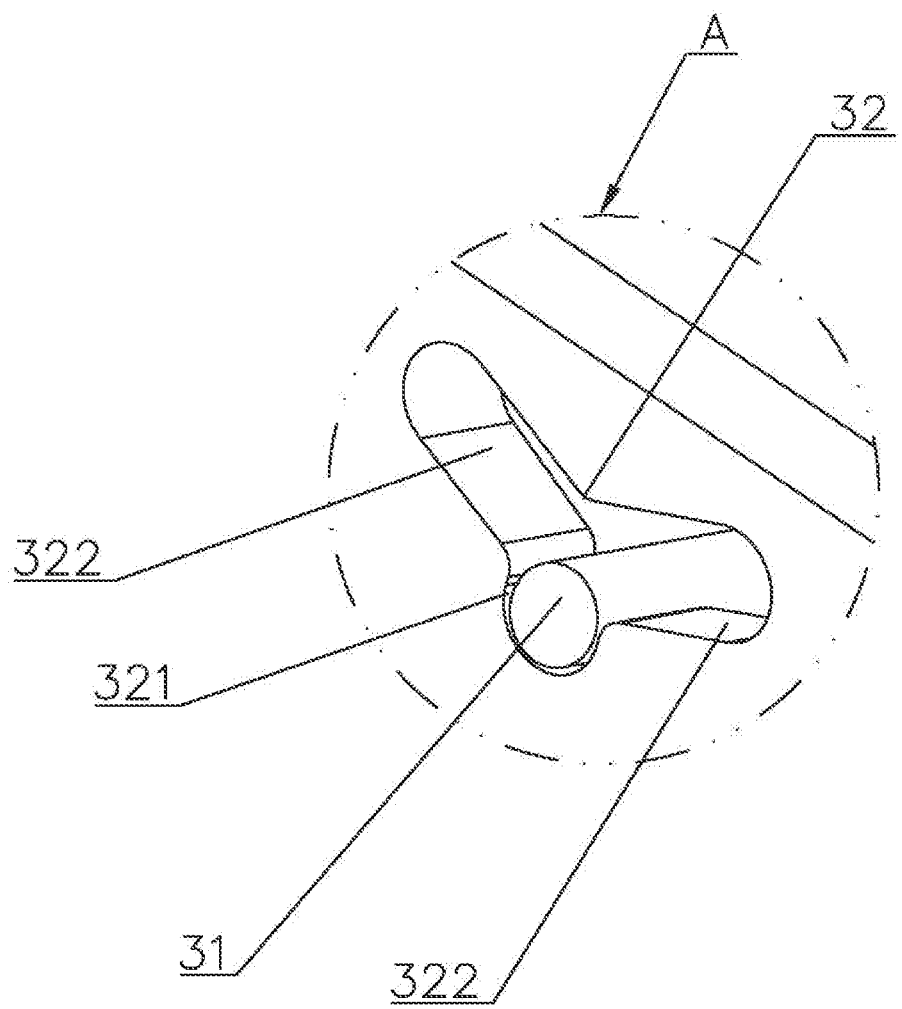
FIG. 2 is an enlarged view illustrating "A" shown in FIG. 1.
Figure 3:
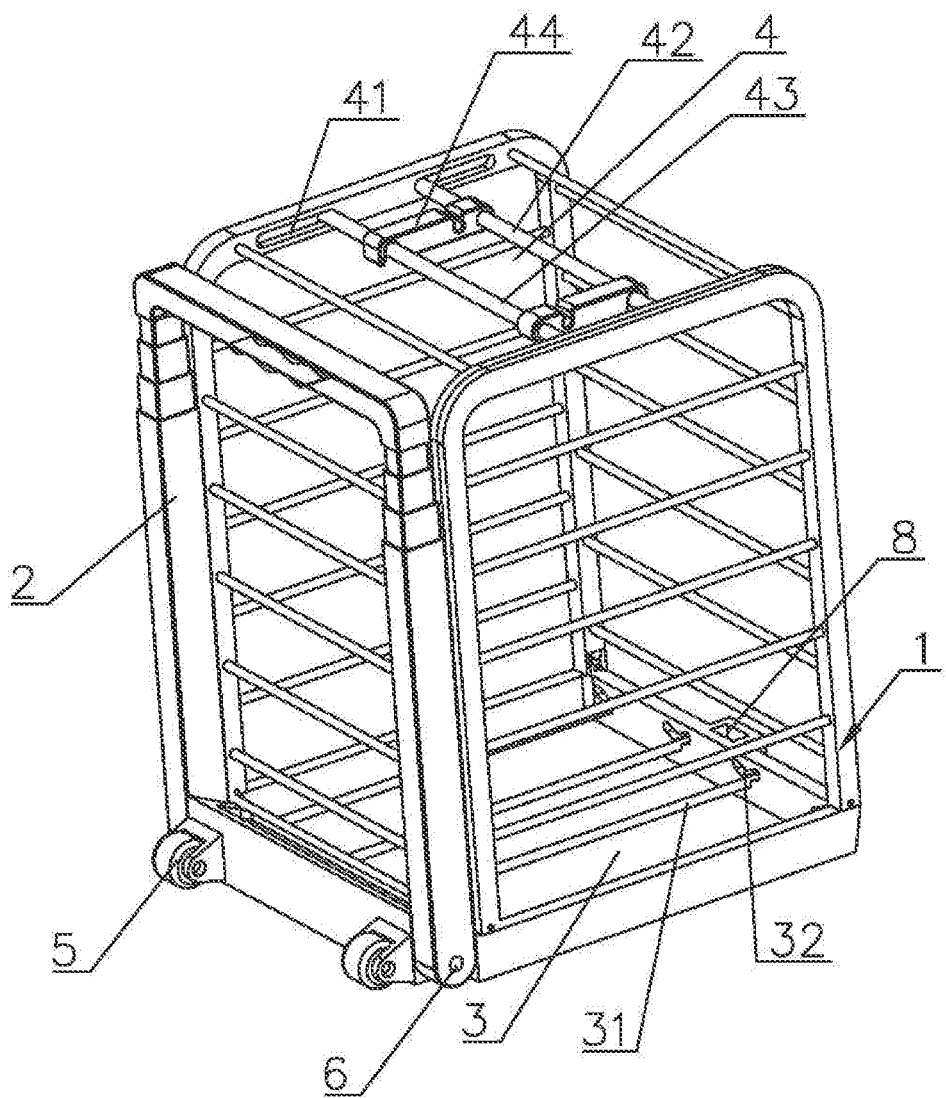
FIG. 3 is a schematic diagram illustrating another view of FIG. 1.
Figure 4:
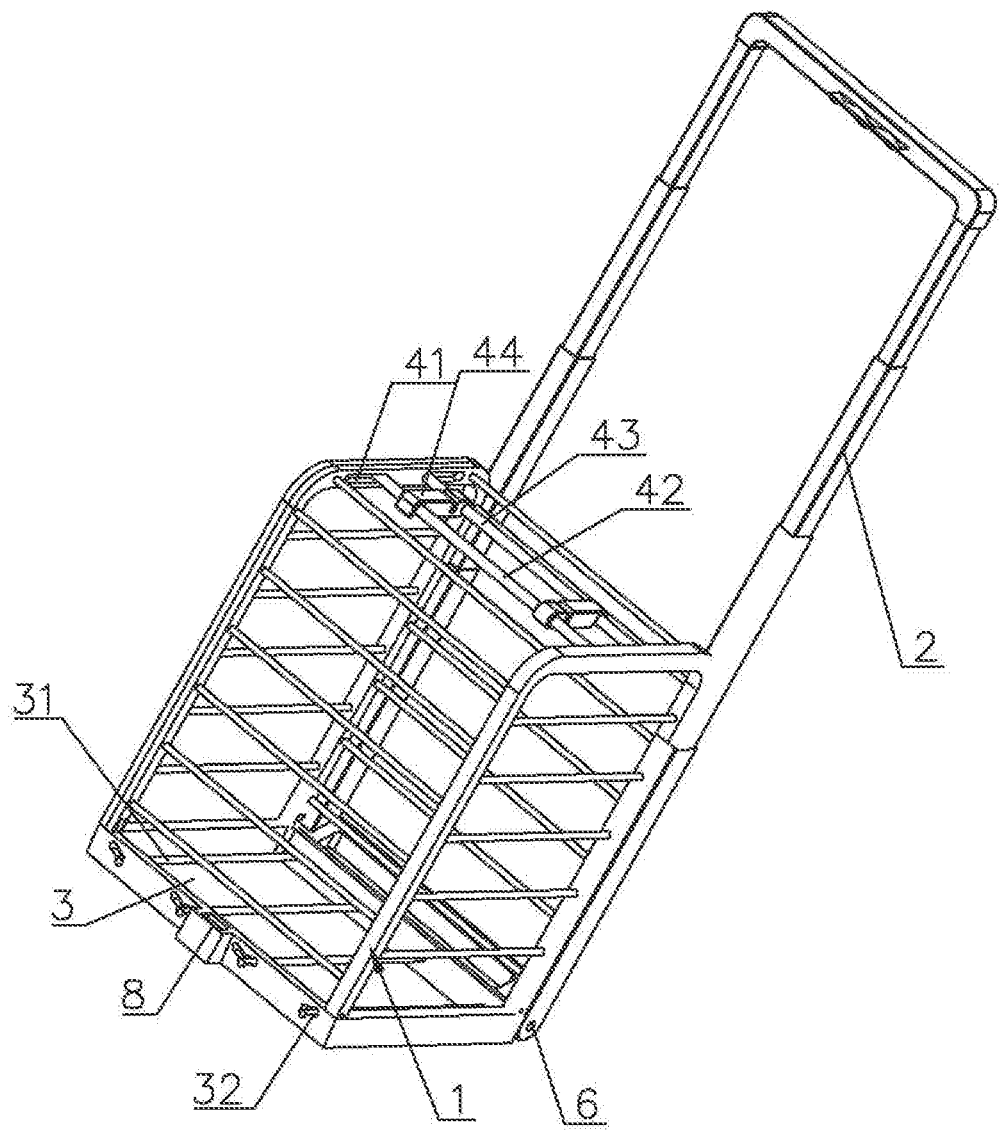
FIG. 4 is a schematic diagram illustrating one usage status of the structure of a ball pickup device of the present disclosure.
Figure 5:
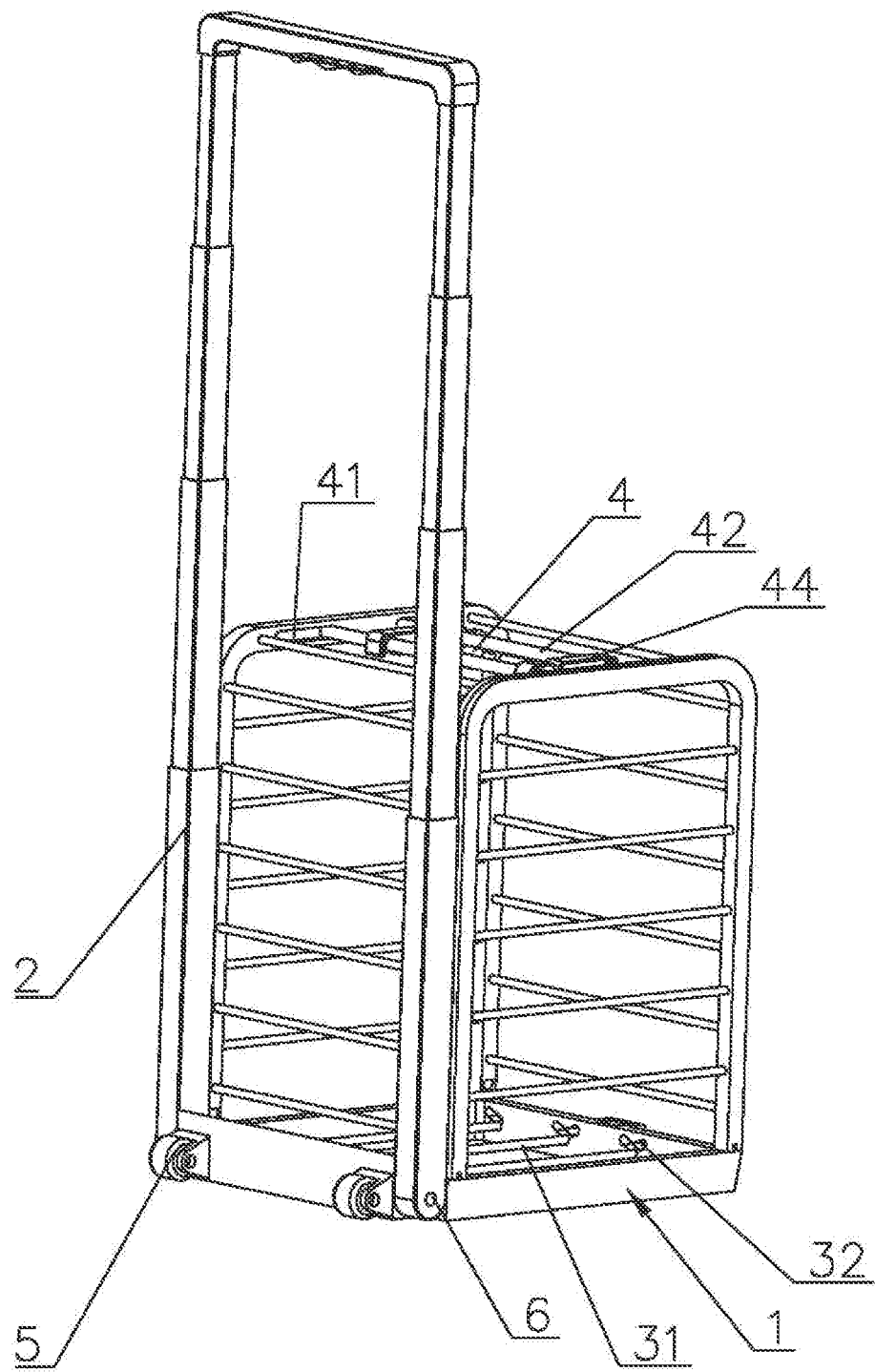
FIG. 5 is a schematic diagram illustrating another view of FIG. 4.
Figure 6:
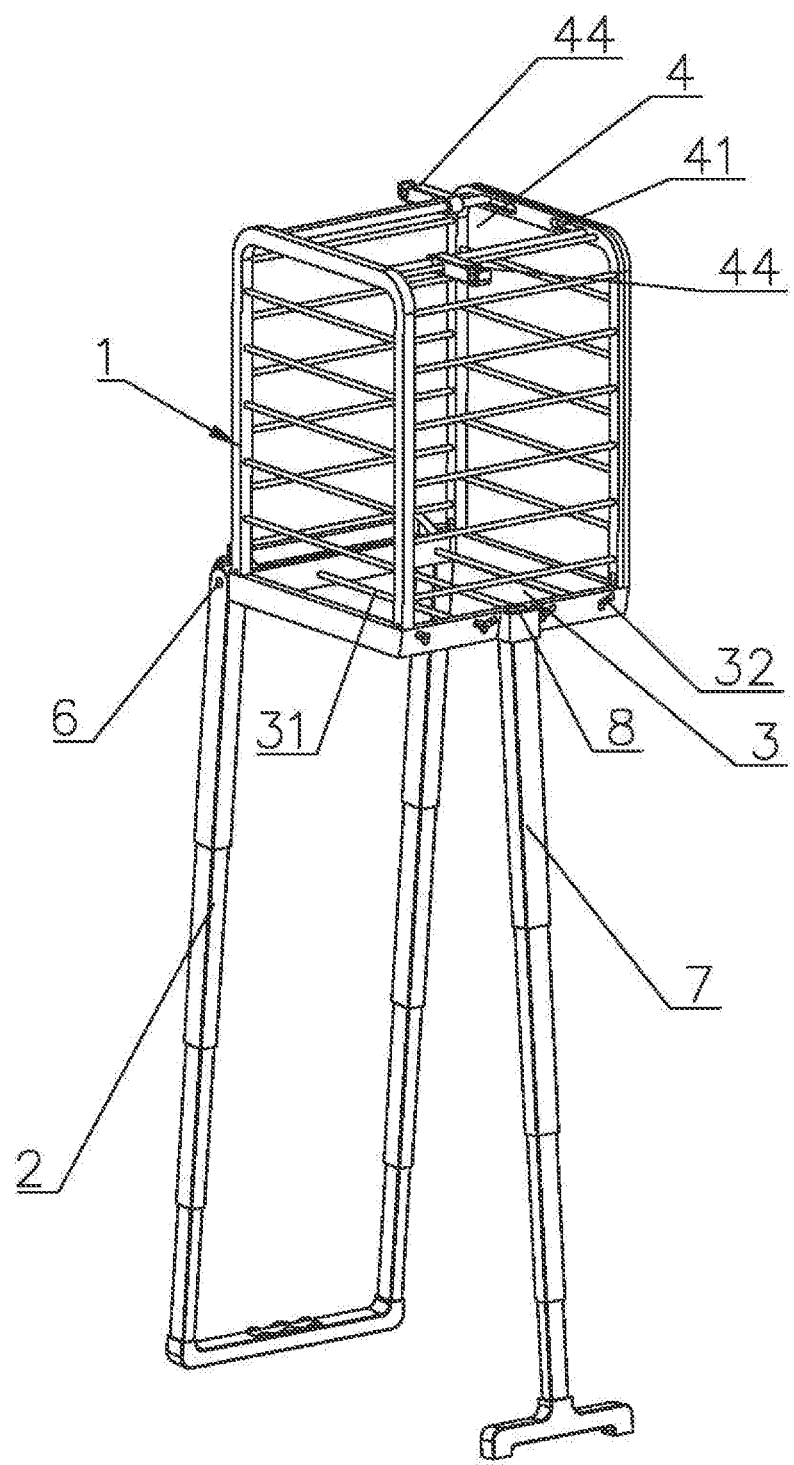
FIG. 6 is a schematic diagram illustrating another usage status of the structure of a ball pickup device of the present disclosure.
Figure 7:
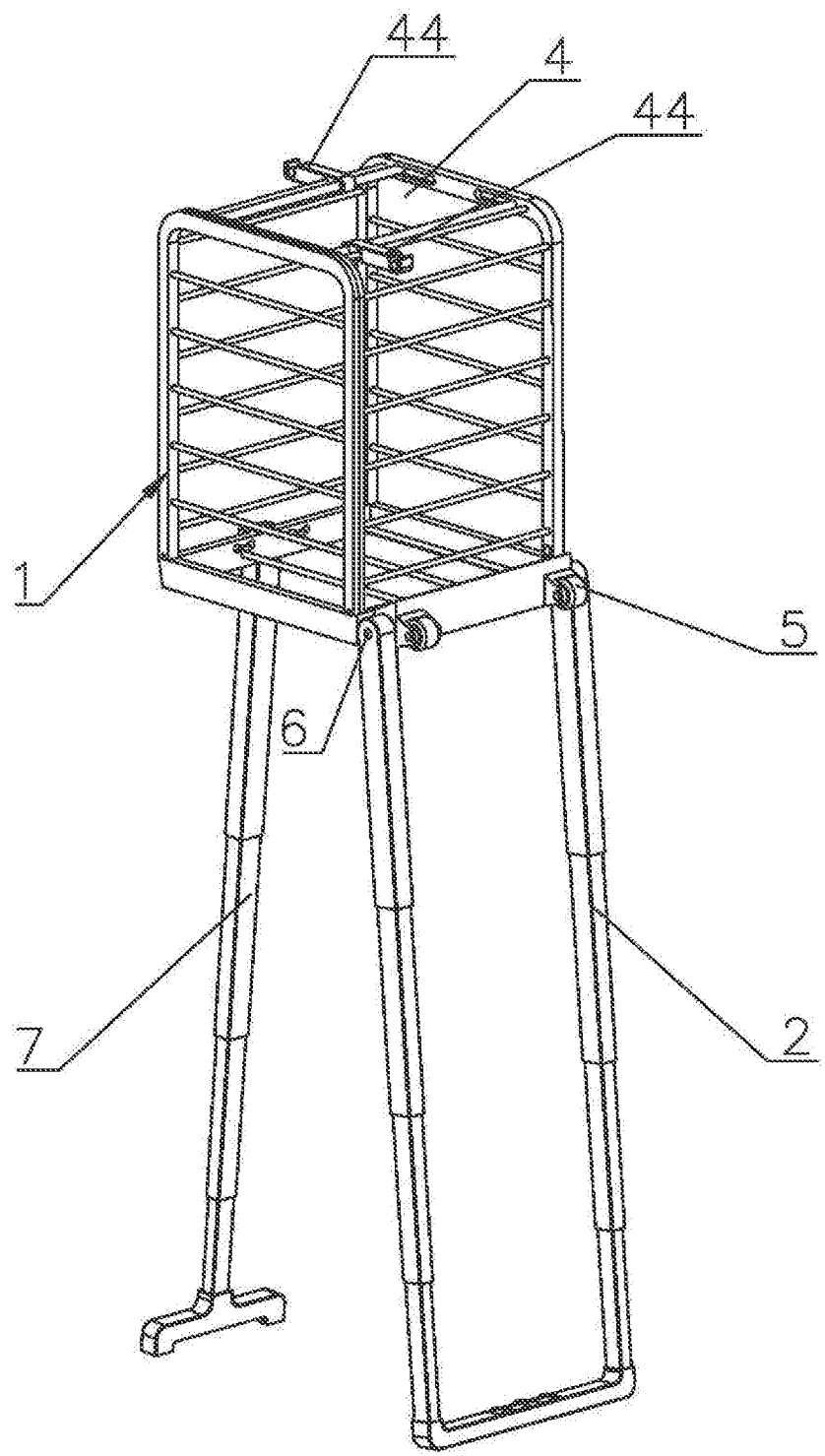
FIG. 7 is a schematic diagram illustrating another view of FIG. 6.

A ball picking device according to one embodiment of the present disclosure, as shown in FIGS. 1 through 7, includes a ball collector 1 and a pull rod 2 connected to the ball connector 1. The ball collector 1 is provided with ball inlets 3 and a ball outlet 4. The ball inlets 3 are formed at the bottom of the ball collector 1 and are formed by a plurality of transverse rods 31 arranged at the bottom of the ball collector 1 in parallel at intervals. One ball inlet 3 is formed by the interval between every two adjacent transverse rods 31, and the interval between every two adjacent transverse rods 31 is smaller than the diameter of a ball. One end of each transverse rod 31 is fixedly connected to one side of a frame at the bottom of the ball collector 1, and the other end of each transverse rod 31 is a movable end and located in a corresponding receding groove 32, wherein each receding groove 32 is disposed at the other side of the frame at the bottom of the ball collector 1, and the largest receding interval of each movable end is larger than the diameter of a ball. When a ball is pressed, the movable ends of the transverse rods 31 move along the receding grooves 32 to recede under the pressure of the ball, and the ball enters the ball collector 1 through one ball inlet 3; after a portion with the largest cross section diameter, connected to the corresponding transverse rods 31, of the ball enters the ball inlet 3, the movable ends of the transverse rods 31 move along the receding grooves 32 to gradually return.

As mentioned previously, the ball pickup device of the present disclosure is advantageous to pick up balls more easily and effortlessly by using each transverse rod 31 of which one end is disposed fixedly to cooperate with the receding grooves 32. When a ball is pressed, the movable ends of the transverse rods 31 move along the receding grooves 32 to recede under the pressure of the ball, and the ball enters the ball collector 1 through one ball inlet 3; after a portion with the largest cross section diameter, connected to the corresponding transverse rods 31, of the ball enters the ball inlet 3, the movable end of the transverse rod 31 moves along the receding grooves 32 to gradually return. The ball pickup device of the present disclosure is advantageous to pick up balls more easily and effortlessly than its conventional counterparts, and can be used durably. The ball inlets 3 which are formed by the plurality of transverse rods 31 arranged in parallel at intervals are capable of picking up balls scattering on areas where the ball collector covers, thereby collecting balls more effectively. In addition, the present disclosure can prevent each ball from being excessively squeezed or from an external pressure to cause damage to its surface or the main body by using the simple structure in the picking process. In addition to the advantages of low cost and long lifetime, the transverse rods of the ball pickup device of the present disclosure can be designed according to the diameter of different balls, such as table tennis, golf ball, tennis ball, baseball and softball and so on.

Each receding groove 32 has a positioning groove 321 and given-way grooves 322 communicating with the positioning groove 321 and located at an oblique upper of the receding groove 32. The movable end of each transverse rod 31 is in the positioning groove 321 when it is a static condition. Each given-way groove 322 extends upwards and obliquely from an adjacent end of the positioning groove 321. When the ball pickup device is in a static condition, the movable end of each transverse rod 31 is in the positioning groove 321. When the ball pickup device is used to pick up balls, the movable end of the transverse rod 31 moves with respect to the positioning groove 321 and then moves to the given-way groove 322 under the pressure of the ball. Because the movable end of each transverse rod 31 moves along each given-way groove 322 under the pressure of the ball, the interval between two adjacent transverse rods 31 increases, so that the ball enters the ball collector 1 through the increased interval. When the ball enters the ball collector 1, the movable end of the transverse rod 31 moves downwards along the given-way groove 322 to return to its original position, that is, in the positioning groove 321 because the pressure of the ball disappears. After that, when the movable end of each transverse rod 31 is in the positioning groove 321, the diameter of each ball inlet 3 is smaller than that of a ball, so that the ball can be remained in the ball collector 1.

The bottom of the ball pickup device is provided with a set of rollers 5, such that the ball collector 1 is movable to pick up balls through the set of rollers 5, thereby saving a user's strength in the picking process.

EMBODIMENT 2

A ball picking device according to one embodiment of the present disclosure can refer to FIGS. 1 through 7, and the main aspect of the present embodiment is substantially the same as that of Embodiment 1. The technical features used in the present embodiment without being explained are the same as that of Embodiment 1, and unnecessary details are not repeated here. The difference between the present embodiment and Embodiment 1 is that: each transverse rod 31 is an elastic rod, and can be made of glass fiber. The transverse rod 31 made of elastic materials can receive less pressure of the ball so as not to cause damage to the ball in the picking process. The transverse rod 31 made of glass fiber can return to its original position easily and has a longer service life.

EMBODIMENT 3

A ball picking device according to one embodiment of the present disclosure can refer to FIGS. 1 through 7, and the main aspect of the present embodiment is substantially the same as that of Embodiments 1 and 2. The technical features used in the present embodiment without being explained are the same as that of Embodiments 1 and 2, and unnecessary details are not repeated here. The difference between the present embodiment and Embodiments 1 and 2 is that: sliding grooves 41 are respectively disposed at two opposite ends of a top frame of the ball collector 1, and a movable rod 42 is provided at the top of the ball collector 1, wherein two ends of the movable rod 42 respectively correspond to the sliding grooves 41, and the ball outlet 4 is opened or closed by moving the movable rod 42 along the sliding grooves 41.

A top transverse rod 43 parallel to the movable rod 42 is provided at the top of the ball collector 1, and fastening members 44 are provided to fasten the movable rod 42, wherein one end of each fastening member 44 is engaged with the top transverse rod 42 and the other end is used to fasten the movable rod 42.

When the present disclosure is used to pick up balls, the fastening members 44 fasten the movable rod 42 to close the ball outlet 4. When a user wants to take balls from the ball collector 1, he/she unfastens the end of each fastening member 44 which fastens the moveable rod 42 and then moves the movable rod 42 along the sliding grooves 41 to open the ball outlet 4 (referring to FIG. 6 and FIG. 7) to take balls out of the ball collector 1. In the present embodiment, opening or closing the ball outlet 4 by using the fastening members 44 and the sliding grooves 41 is user-friendly and advantageous to take balls from the ball collector 1.

EMBODIMENT 4

A ball picking device according to one embodiment of the present disclosure can refer to FIGS. 1 through 7, and the main aspect of the present embodiment is substantially the same as that of Embodiments 1, 2 and 3. The technical features used in the present embodiment without being explained are the same as that of Embodiments 1, 2 and 3, and unnecessary details are not repeated here. The difference between the present embodiment and Embodiments 1, 2 and 3 is that: a position where each of the two top frames of the ball collector 1 corresponding to each end of the top transverse rod 43 is provided with a sliding groove 41, and the top transverse rod 43 is movable along the sliding groove 41. The top transverse rod 43 can be used as another movable rod 42 for enlarging the opening of the ball outlet 4, such that the ball can be taken out of the ball collector 1 more conveniently. In addition, the arrangement of two movable rods 42 can effectively prevent the difficulty in taking balls from the ball collector 1 when one of the movable rods 42 is out of order.

EMBODIMENT 5

A ball picking device according to one embodiment of the present disclosure can refer to FIGS. 1 through 7, and the main aspect of the present embodiment is substantially the same as that of Embodiments 1, 2, 3 and 4. The technical features used in the present embodiment without being explained are the same as that of Embodiments 1, 2, 3 and 4, and unnecessary details are not repeated here. The difference between the present embodiment and Embodiments 1, 2, 3 and 4 is that: the ball pickup device is provided with a supporting rod 7, and a location where the pull rod 2 connects the ball collector 1 is provided with a rotating apparatus 6. The pull rod 2 can have a 180 degrees rotation to the underneath of the ball collector 1 by using the rotating apparatus 6. The rotating apparatus 6 can be a rotating shaft or a combined rotating mechanism used to define the rotating angle, and the present disclosure is not limited thereto. The supporting rod 7 is used to maintain the stability of the ball pickup device in the picking process, and is detachable. When picking balls, the supporting rod 7 is detached from the ball collector 1 and when releasing balls, the supporting rod 7 is mounted on the ball collector 1. In addition, when releasing balls, the supporting rod 7 and the pull rod 2 which has been rotated underneath the ball collector 1 together support the ball pickup device at a height, such that a user can take balls without having to stoop down. In addition, the supporting rod 7 can be designed to be a stretchable rod corresponding to the pull rod 2.

The pull rod 2 is telescopic, and when the ball pickup device is not used, the pull rod 2 shrinks to occupy a smaller space so as to contribute to the storage and package. When the ball pickup device is used to pick up balls, the pull rod 2 can be pulled to correspond to a user's height.

The ball collector 1 is provided with a connecting part 8, and the supporting rod 7 is detachably connected to a connecting end of the connecting part 8. Because the supporting rod 7 is detachably connected to the ball collector 1, the present disclosure has a simple structure and is easy to use.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A ball pickup device, comprising: a ball collector and a pull rod connected to the ball connector, wherein the ball collector is provided with ball inlets and a ball outlet, the ball inlets are formed at the bottom of the ball collector and are formed by a plurality of transverse rods arranged at the bottom of the ball collector in parallel at intervals, one ball inlet is formed by the interval between every two adjacent transverse rods, and the interval between every two adjacent transverse rods is smaller than the diameter of a ball;

one end of each transverse rod is fixedly connected to one side of the frame at the bottom of the ball collector and the other end of each transverse rod is a movable end and located in a corresponding receding groove, each receding groove is disposed at the other side of frame at the bottom of the ball collector, and the largest receding interval of each movable end is larger than the diameter of a ball, and when the ball collector presses a ball on the ground, the movable ends of the transverse rods move along the receding grooves to recede under the pressure of the ball, and the ball enters the ball collector through one ball inlet; after a portion with the largest cross section diameter, connected to the corresponding transverse rods, of the ball enters the ball inlet, the movable ends of the transverse rods move along the receding grooves to gradually return.

2. The ball pickup device according to claim 1, wherein the receding groove comprises a positioning groove and given-way grooves communicating with the positioning groove, and the movable end of each transverse rod is in the positioning groove when it is a static condition.

3. The ball pickup device according to claim 2, wherein each given-way groove extends upwards and obliquely from an adjacent end of the positioning groove.

4. The ball pickup device according to claim 1, wherein the transverse rod is an elastic transverse rod.

5. The ball pickup device according to claim 1, wherein sliding grooves are respectively disposed at two opposite top frames of the ball collector, a movable rod is provided at the top of the ball collector, two ends of the movable rod respectively correspond to the sliding grooves, and the ball outlet is opened or closed by moving the movable rod along the sliding grooves.

6. The ball pickup device according to claim 5, wherein a top transverse rod parallel to the movable rod is provided at the top of the ball collector, and fastening members are provided to fasten the movable rod, wherein one end of each fastening member is engaged with the top transverse rod and the other end is used to fasten the movable rod.

7. The ball pickup device according to claim 6, wherein a position where each of the two top frames of the ball collector corresponding to each end of the top transverse rod is provided with a sliding groove, and the top transverse rod is movable along the sliding groove.

8. The ball pickup device according to claim 1, wherein the bottom of the ball pickup device is provided with a set of rollers.

9. The ball pickup device according to claim 1, wherein the ball collector is provided with a detachable supporting rod, a location where the pull rod connects the ball connector is disposed with a rotating apparatus, the pull rod is rotated underneath the ball collector through the rotating apparatus, and the supporting rod and the pull rod which has been rotated underneath the ball collector together form a supporting frame to support the ball pickup device.

10. The ball pickup device according to claim 9, wherein the pull rod is a telescopic rod.

* * * * *